June 30, 1925.
A. E. SHARPLES
CHUCK
Filed June 18, 1923
1,544,107
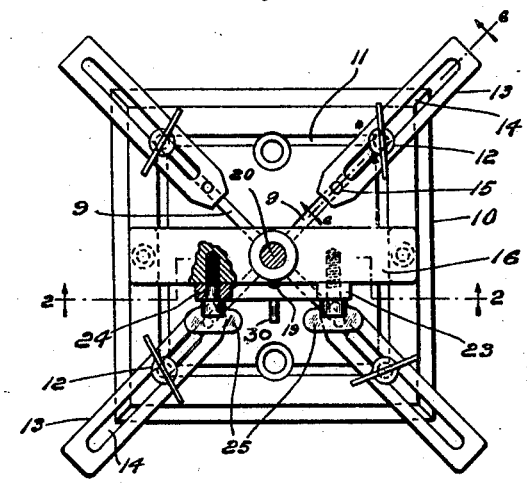
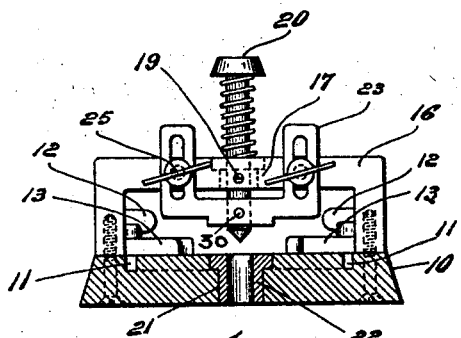
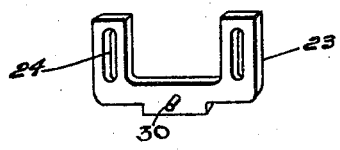
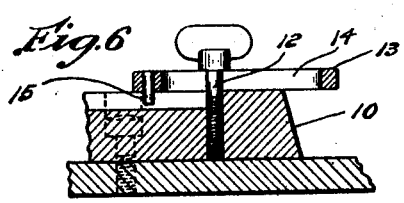
Inventor
Arthur E. Sharples
By Barlow & Barlow
Attorneys Patented June 30, 1925.

1,544,107

UNITED STATES PATENT OFFICE.

ARTHUR E. SHARPLES, OF PROVIDENCE, RHODE ISLAND.

CHUCK.

Application filed June 18, 1923. Serial No. 646,087.

*To all whom it may concern:*

Be it known that I, ARTHUR E. SHARPLES, a citizen of the United States, residing at Providence, in the county of Providence and State of Rhode Island, have invented certain new and useful Improvements in Chucks, of which the following is a specification.

This invention relates to an improved construction of combined work chuck and tool guide: and has for its object to provide a chuck in which work may be held while being operated upon by a drill, punch or other tool, the chuck being provided with a plurality of clamping jaws operable upon the base of the chuck in combination with a tool-guide for supporting and directing the tool while operating upon the work.

A further object of this invention is the provision of a clamp mounted upon the tool supporting member of the chuck to assist in binding the work in position while being operated upon.

A still further object of the invention is the provision of removable bushings both in the tool-guide and also in the base whereby tools of different sizes may be accurately guided above the work and the bushings in the base which may be interchangeable to cooperate with the tools of different sizes and characters.

With these and other objects in view, the invention consists of certain novel features of construction, as will be more fully described, and particularly pointed out in the appended claim.

In the accompanying drawings:

Figure 1 is a plan view of my improved chuck unit.

Figure 2 is a sectional elevation on line 2—2 of Figure 3.

Figure 3 is a detail of the clamping member adapted to engage the upper surface of the work.

Figures 4 and 5 show removable bushings which may serve to support the tool while working, or providing an opening in the base into which the cutting end of the tool may project.

Figure 6 is an enlarged sectional view on line 6—6 of Figure 1, showing the groove in the base, and the guide pin in the work clamping jaw.

It is found in the practical operation of chucks, or adjustable jigs, in which work is held while being operated upon in such machines as hand-operated drills, or other machines, desirable to be able to position and clamp the work onto the base of the chuck and to also provide a guide for the tool above the work whereby a prick-punch may be first inserted to mark the work and then removed with its bushing and an operating tool with a bushing of a larger size positioned to guide the tool while operating upon the work. It is also found of advantage to be able to provide a bushing in the base of the chuck having an opening of the required diameter whereby the drill or tool upon being passed through the work, may be received into this opening in the base. It is also found of advantage to so mount the clamping jaws upon the base that they may be adjusted either radially, to and from the center of the chuck, or on lines at an angle to these radial lines, whereby work of different shapes may be engaged and properly retained in the chuck; and the following is a detailed description of one means by which these advantageous results may be obtained:—

With reference to the drawings, 10 designates the base of a chuck which may be of any suitable thickness and of any suitable shape. In the face of this base member, I have formed a set of grooves 11 and 9, the former being arranged in a square about the center of the chuck, while the set 9 is shown as radially arranged to extend outwardly from the center of the chuck to the corners of the square groove and at each corner in this double set of grooves, I have provided a binding bolt 12 for the clamping jaws 13 which are mounted to slide upon the face of the chuck. Each of these clamping jaws is slotted longitudinally as at 14 through which slot the binding bolt 12 passes, and each of these clamping jaws as shown as being provided with a guide pin or projection 15 which may engage either of the grooves 9 or 11 whereby the jaws may be slid or adjusted radially towards and from the center of the chuck or at an angle to these radial grooves to engage work of various shapes. On the base of this chuck, I have formed a bridge member 16 which extends across from side to side above the center of the chuck and raised a substantial distance above the face of the same. In the center of this bridge member, I have formed an opening 17 which is adapted to receive bushings 18 of different sizes and which may be secured therein by a binding screw 19. These bushings may vary in diameters to suit requirements, in some cases they are provided with a hole of a diameter to receive and guide a prick-punch 20, and after the work has been operated upon by the prick-punch, this punch with its bushings may be removed and a bushing of the desired size positioned to receive and guide the drill or tool (not shown) which may be passed therethrough to be guided while operating upon the work clamp upon the bed-plate.

This bed-plate is provided with a central opening 21 into which a bushing 22 may be positioned, the same being in some instances of a size to permit the drill which operates upon the work to pass therethrough, while in other cases a solid plug may be placed therein for the purpose of supporting the center of the work, if desired, or in still other cases a die may be placed in this opening to cooperate with a punch which may be mounted to operate through the larger guide bushing in the guide bridge.

In some instances, I have found it desirable to provide a clamping member 23 to operate independently of the clamping jaws to assist in binding the work in position, which member may be formed in U-shape, as shown in Figures 3, the same having its arms slotted as at 24 to be manually adjusted vertically by means of a pin 30 serving as a handle and bound in adjusted position by screws 25 to firmly clamp the work in position while being operated upon by the tool.

My improved work chuck is extremely simple and practical in its operation and by its use work may be set and firmly clamped in position and then the chuck placed in a drilling machine or other machine to hold the work while being operated upon by the tool therein.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A work chuck comprising a base, a rectangularly shaped groove therein, oppositely disposed diagonal grooves also in said base joining said rectangular groove, a plurality of clamping jaws slidable on the face of said base and each having a slot therein, a pin on each of said jaws slidable in and guided by either said rectangular or diagonal grooves, and a binding bolt extending through the slot in each of said jaws for holding them in adjusted position.

In testimony whereof I affix my signature.

ARTHUR E. SHARPLES.